United States Patent [19]

Grenthe

[11] Patent Number: 4,670,156

[45] Date of Patent: * Jun. 2, 1987

[54] SORBENT FOR OIL OR OTHER LIQUID HYDROCARBONS

[75] Inventor: Bo Grenthe, Avesta, Sweden

[73] Assignee: Universal Fibers, Inc., New York, N.Y.

[*] Notice: The portion of the term of this patent subsequent to Nov. 5, 2002 has been disclaimed.

[21] Appl. No.: 583,934

[22] Filed: Feb. 27, 1984

Related U.S. Application Data

[63] Continuation of Ser. No. 355,370, Mar. 8, 1982, abandoned, which is a continuation-in-part of Ser. No. 285,105, Jul. 14, 1981, abandoned.

[30] Foreign Application Priority Data

Nov. 26, 1979 [SE] Sweden .................. 7909748

[51] Int. Cl.⁴ .................. C02F 1/28; B08B 7/00
[52] U.S. Cl. .................. 210/691; 134/7; 210/924
[58] Field of Search .............. 210/680, 691, 502, 506, 210/508, 924; 162/100, 183; 134/7

[56] References Cited

U.S. PATENT DOCUMENTS

| 3,382,170 | 5/1968 | Pape | 210/680 |
|---|---|---|---|
| 3,591,524 | 7/1971 | Eriksen | 252/427 |
| 3,630,891 | 12/1971 | Petersen et al. | 210/680 |
| 3,756,948 | 9/1973 | Weinberg | 210/680 |
| 3,770,575 | 11/1973 | Ball | 210/924 |
| 4,011,159 | 3/1977 | Stein et al. | 134/7 |
| 4,551,253 | 11/1985 | Grenthe | 210/691 |

FOREIGN PATENT DOCUMENTS

| 347362 | 12/1978 | Austria . |
| 982951 | 2/1976 | Canada . |
| 1248197 | 8/1967 | Fed. Rep. of Germany . |
| 1519797 | 4/1971 | Fed. Rep. of Germany . |
| 2212605 | 11/1972 | Fed. Rep. of Germany . |

OTHER PUBLICATIONS

Markham et al., "Pulp Mill Reject Handling System" TAPPI, vol. 62, No. 9, Sep. 1979, pp. 59-62.
FLAKT Flash Dryer-a Co-Current Temperature System for Economic and Gentle Drying of Pulp by Berndt Kaltin.
Oil Spill Prevention and Removal Handbook by Marshall Sitting.

*Primary Examiner*—Ivars Cintins
*Attorney, Agent, or Firm*—St.Onge Steward Johnston & Reens

[57] ABSTRACT

Disclosed herein is a hydrophobic sorbent, particularly useful for the sorption of oil or other similar tacky or viscous hydrocarbons, which is prepared by subjecting a water-containing, fibrous cellulosic product, particularly sulphite reject fibers, to rapid heating to cause expansion of the fibers through gasification of the water therein. The sorbent is capable of exceptionally rapid and tight sorption and binding of even heavy oils.

7 Claims, 1 Drawing Figure

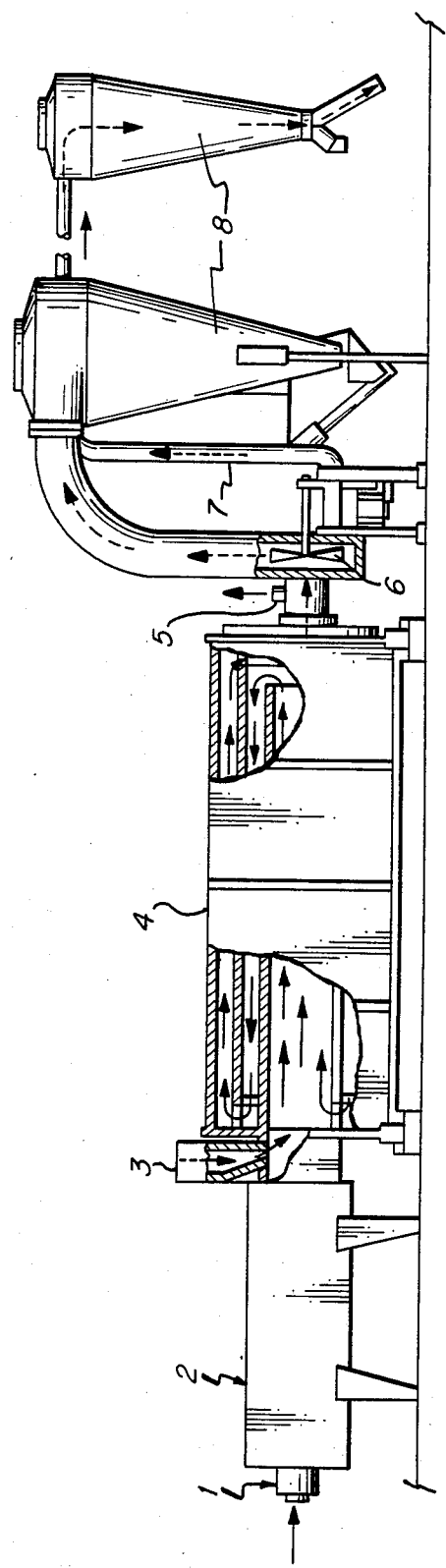

SORBENT FOR OIL OR OTHER LIQUID HYDROCARBONS

CROSS-REFERENCE TO RELATED APPLICATION

This is a continuation of application Ser. No. 355,370, filed Mar. 8, 1982 which is a continuation-in-part of my co-pending application Ser. No. 285,105, filed July 14, 1981, entitled "Improvement In An Absorbent And A Method Of Its Manufacture," both now abandoned.

BACKGROUND OF THE INVENTION

The present invention relates to a hydrophobic sorbent material, particularly for the sorbing of oil from the surface of water, and to a method for its manufacture.

Unquestionably, a serious problem which long has plagued industrial and environmental concerns is the removal of oil from unwanted areas into or onto which it has been discharged. Of particular concern, of course, is the removal of unintentionally discharged oil from water or shore areas as occurs as a result, for example, of oil tanker accidents at sea or mishaps in the loading or unloading of oil from these tankers in port. Other occasions where oil removal is of concern run the gamut from relatively major problems such as the discharge of oil at areas around oil wells and oil storage facilities or the cleaning of surfaces in which oil was stored (e.g., on-shore storage tanks, oil holds of tankers) to more mundane problems such as the unintentional discharge or leaking of oil from vehicles onto road or driveway surfaces.

It is not surprising, therefore, that numerous solutions have been proposed for dealing with the problem of removing oil from unwanted areas. One class of proposed remedies relies upon bacterial degradation of oil, but such methods are extremely expensive, raise enumerable environmental concerns and are not particularly effective in many areas and under many conditions typically encountered, for example, the low temperatures of sea water into which oil has been spilled.

Another class of proposed remedies falls broadly under the category of oil sorbents or absorbents, which are intended to remove oil from an undesired surface or areas through physical or quasi-chemical sorption forces, i.e., wherein the oil per se is not chemically broken down, decomposed or otherwise altered. Sorbent materials proposed for use in oil removal embrace a wide variety of products, ranging from sand to complex, chemically treated cellulosic materials. In general, none of the proposed sorbents is particularly well suited for the sorption of heavy oils associated with the most troublesome and serious accidental oil discharges. Indeed, this fact is so widely accepted that tests of the sorption ability of proposed products uniformly employ number one heating oil, which is a very light oil fraction differing substantially, in its ability to be sorbed, from the heavy oils, e.g., crude oil.

Apart from this and other general deficiencies, each particular sorbent or class of sorbents presents added difficulties. For example, the inability of many sorbents to resist sorption of water is a very serious limitation considering that the most serious oil clean-up operations involve discharge of oil in seas or other bodies of water. Attempts have been made in the past to impart the requisite hydrophobicity to oil sorbents but, even where some success was obtained, the cost involved often is prohibitive.

A particularly serious limitation of many sorbents, moreover, is the fact that, once the oil has been sorbed, the sorbent/oil complex still exhibits the stickiness of the oil, presenting as many difficulties in disposing of the oil-laden sorbent as existed in removing the oil from the undesired area or surface. In addition, it is found that many oil sorbents do not retain sorbed oil for a period of time sufficient to accomplish removal of the sorbent/oil complex from the site of the oil discharge before the sorbent "gives up" the oil to the same or some other undesired site.

Examples of sorbents of the type described abound in the literature. For example, in U.S. Pat. No. 3,630,891 there is disclosed an oil sorbent prepared from wood fibers which have been treated with sizing material to render the fibers water repellant. A similar product is described in U.S. Pat. No. 3,770,575 wherein wet wood pulp is treated with sizing and subjected to flash drying. U.S. Pat. No. 3,382,170 describes an oil absorbent comprised of expanded perlite, a mineral containing a substantial quantity of silica. Other silica or silicate-based oil absorbents are described in German Pat. Nos. 1,248,197 and 1,519,797. U.S. Pat. No. 3,591,524 describes an oil absorbent comprised of a cellulosic base impregnated with a complex oil-in-water, ammonium or amine-containing emulsion. In U.S. Pat. No. 3,756,948, polystyrene foam crumbs are used for oil absorbtion.

SUMMARY OF THE INVENTION

It is an object of the present invention to provide an inexpensive, hydrophobic sorbent material, having particular applicability to the sorption of hydrocarbon products such as oil.

Another object of the present invention is to provide a hydrophobic sorbent for the sorption of oil or other viscous products which does not exhibit the stickiness or tackiness of the sorbed material after sorption.

Yet another object of the present invention is to provide a hydrophobic sorbent material which is itself environmentally harmless and which can be disposed of in an economical, safe manner after sorption.

Still further objects of the present invention are the provision of a method for manufacturing a hydrophobic sorbent and a method for removing oil from undesired areas using the sorbent of the present invention.

These and other objects are achieved according to the present invention by the provision of a sorbent material which comprises a normally high moisture-containing fibrous cellulosic material or derivative which has been subjected to rapid forced heating to reduce its moisture content and to expand the fibers of the cellulosic material.

According to the preferred embodiment of the present invention, the cellulosic material comprises the reject fraction from a paper production mill employing a sulphite pulping procedure.

In accordance with the process of this invention, the moisture-containing fibrous cellulosic material, e.g., sulphite reject, is subjected to moisture reduction method(s), at least the final or near-final stage of which comprises subjecting the material to rapid forced heating.

The sorbent according to the present invention is hydrophobic and displays an excellent absorption affinity for oils, including heavy oils, as well as other liquid hydrocarbon-based products such as ethylene glycol and propylene glycol.

The hydrophobicity of the sorbent of the present invention makes it ideally suited for the recovery of oil when the oil is associated with water, e.g., as occurs as the result of oil spills at sea. Due to its expanded nature, moreover, the sorbent is quite light in its unsorbed state and floats on water surfaces. The hydrophobicity of the sorbent can be augmented if desired, by providing a thin coating of, e.g., waxy material on the sorbent. The coating is added only after the cellulosic material has been converted to a hydrophobic sorbent, i.e., only after the rapid forced reduction of moisture has occurred. The augmented hydrophobic nature of the sorbent is useful where it is contemplated that the sorbent will be in contact with water for long periods of time, as might occur in the case of treating large oil spills at sea.

An outstanding advantage of the sorbent of the present invention is that it is very inexpensive to prepare since the base cellulosic material itself is inexpensive, particularly where a reject (i.e., waste) product of paper mills is employed. The costs associated with the rapid forced heating of the source material to form the sorbent of the present invention are not particularly great and, as described later, can be ameliorated to some extent through use of certain less expensive water removal means in early stages of the moisture-reduction sequence.

Another highly advantageous property of the sorbent of the present invention is its extremely tight binding of sorbed oil or other hydrocarbon materials. As a result of this feature, there is no immediate urgency (as exists when other, less efficient sorption materials are used) either to remove the sorbent/oil complex to a site where oil loss from the sorbent is not problematical or to remove oil from the sorbent as soon as possible. As to handling of the sorbeht/oil complex, it is found that the complex does not exhibit the degree of stickiness or tackiness exhibited by the oil per se. Hence, the sorbent/oil complex can be removed from the site of oil sorption for further treatment or processing with relative ease.

The sorbent/oil complex may, if desired, be subjected to methods designed to desorb at least some of the oil therefrom, and the oil thus obtained may be re-used for its normal purposes. For example, the sorbent/oil complex may be efficiently treated in a mechanical filter press to remove oil therefrom. The thus treated sorbent, which may contain residual oil not released by the pressing operation, may be combusted to obtain its fuel values. Since the sorbent is based upon cellulosic materials, combustion thereof will rarely be associated with the production of any harmful or undesirable by-products.

BRIEF DESCRIPTION OF THE DRAWING

The single FIGURE represents a schematic view of an apparatus for achieving the rapid, forced heating of the cellulosic product.

DETAILED DESCRIPTION OF THE INVENTION

The present invention is described in further detail below with reference to particular, illustrative embodiments and examples.

The "starting" or "raw" material in the preparation of the sorbent of the present invention is a fibrous cellulosic material.

In particular, the starting material preferably consists of a product of a chemical pulping or a semichemical pulping operation of the type known to the paper-making industry. For use in the present invention, these products must be obtained from the pulping or paper-making process at a point prior to the practice of typical operations such as bleaching, sizing, etc. Such products are conveniently available as a fibrous waste material from paper making processes since the fibers useful in the present invention include those designed to be deliberately removed at one or more stages in the paper-making process so as not to be present in the final pulp processed into paper products. Alternatively, such fibers may be obtained from a paper making process operated in a manner such that fibers of the desired size are retained through the process and, hence, included in the final pulp, after which they are removed by appropriate screening or other separation techniques.

The most preferred starting material is sulphite reject, i.e., the reject or sludge product from a sulphite pulping process. This reject typically contains large coarse fibers of a larger particle size than normally used in making paper products, as well as fibers that are too short for use in making paper products. Although it has not been clearly established why sulphite reject, when subjected to rapid heating according to the present invention, results in a product having such desirable properties vis-a-vis oil removal, one theory is that the very short fibers of such reject provide the absorbent with an oleophilic surface having a multitude of sites or points for taking up oil in which it is in contact. Another theory is that the low lignen content of sulphite reject allows the fibers to become greatly frayed when subjected to rapid heating, irrespective of the length or size of the fibers.

The fibrous base or starting material must possess some minimum degree of water (internal) such that the rapid forced heating to which it is subjected will cause the expansion of the fibers required for imparting oleophility and hydrophobicity. The precise amount of such moisture is not fixed per se, but may differ depending upon the type and size of the starting material the type of heating apparatus, and other like factors. Expansion during the rapid, forced heating is caused by gasification of the water contained in the fibers (causing them to expand rapidly or to "pop") and the degree of internal moisture thus need only be sufficient to achieve this result. Typically, the minimum water content will generally be about 10 to 20% by weight of the fiber.

Subject to the foregoing minimum moisture content, the starting fibrous material may be directly subjected to the rapid, forced heating without particular regard for the presence in the fibers of greater than the minimum amount of moisture. Thus, for example, fibrous material containing as high as 60 to 80% moisture by weight can be expanded through rapid, forced heating to obtain the sorbent of the present invention. In such cases, the heating which occurs probably results in a non-expansion-causing removal of a certain degree of the moisture until a point is reached where the remaining moisture is gasified rapidly to cause expansion. As will be appreciated, however, the load imposed upon the rapid, forced heating apparatus in such cases may be so great as to make uneconomical the removal of moisture in this manner and/or interfere to some degree with the desired expansion. Moreover, if the residence time of the fibers in the heating apparatus is too long, undesirable charring may occur. Accordingly, it may be desirable to first effect removal of a portion of the moisture through inexpensive, non-degradative means such as centrifuging or mild heating and only thereafter subjecting the resulting moisture containing fibrous material to rapid, forced heating to obtain the desired expansion.

The foregoing presupposes that the fibrous material contains an inherent degree of moisture by virtue of the source from which it was obtained, e.g., as waste from a pulping process, etc. It also is possible, however, to begin with a low moisture content fibrous material which is hydrated to the degree required in order to render it suitable for expansion through rapid, forced heating.

The temperature at which the moisture-containing, fibrous material is heated to effect the desired expansion of the fibers must be sufficient to gasify the moisture present (or a sufficient portion thereof), so as to cause expansion, preferably in the shortest possible time, while not so great as to burn or char the fibers. Given these criteria, heating temperatures within the range of from about 220° F. to about 1200° F. may be employed, higher temperatures in this range resulting in more rapid expansion. Preferred heating temperatures fall within the range of from about 500° F. to 700° F. The residence time of the fibrous material at these heating-expansion conditions should be kept to a minimum, and is preferably in the range of from about one to five (5) minutes.

The final moisture content of the expanded sorbent typically will be in the range of from about 1 to 5% by weight and is desirably maintained as low as possible so as to maximize the available volume for sorption of oil or other hydrocarbons. This final moisture content generally will be achieved as a direct result of the rapid, expansion-causing heating. Should this not be the case, or should a still lower moisture content be desired, conventional drying of the expanded sorbent can be performed to achieve this result, taking care to employ non-degradative drying conditons.

The particular apparatus used for the rapid, expansion-causing heating of the starting material according to the present invention is not of critical importance so long as it is capable of generating the required temperatures. Either batch, continuous or semi-continuous processing may be employed.

A suitable apparatus for achieving the rapid heating to expansion of the fibrous material is shown in the accompanying drawing. The apparatus comprises a furnace 2 with a burner 1, which heats the inlet air to a rotary drying chamber 4. The chamber 4 comprises several concentric inner cylinders, which are blown through by air which thereafter flows out at an outlet 5. The starting material, e.g., sulphite pulp fiber reject, is supplied in a suitable manner at 3. The reject here has a very high degree of moisture, but is dried in the chamber 4 to a moisture content of only a few percent. At the outlet 5 from the drying chamber 4 a suction fan 6 is located which ejects the air and the dried sulphite reject via a pipe to one or more cyclones 8 for separating air from the absorbent. The absorbent then precipitates on the lower side of the cyclones 8 and is transported away to be packed. In the pipe from the fan 6 and respectively in the cyclones 8 nozzles can be arranged in a way (not shown in detail) for spraying a mist of wax with a fusing point preferably of about 53° C. dissolved in ether petroleum, when the absorbent is desired to have additional or extended hydrophobic properties.

Experiments regarding the absorption capacity of the sorbent of the present invention do not show surprising results with respect to the amounts absorbed, since, although the sorbent according to the invention has a very low density, one liter thereof cannot, of course, absorb more than one liter oil minus its own volume, as is the case with other absorbents. As to the speed of absorption, the absorbent of the present invention sorbs at a rate on par with the best absorbent materials currently available. However, the great difference between the absorbent of the present invention and known absorbent is the former's ability to tightly bind or grip the oil once it has been sorbed and to quickly render the sorbed oil/sorbent complex non-sticky. Many known absorbents either lose the sorbed oil very rapidly and/or sorb the oil in a manner which causes the sorbent/oil complex to still exhibit the stickiness of the oil per se, thereby greatly hampering handling of the sorbed oil. The absorbent of the present invention quickly renders even very thick, heavy oils (e.g., crude oil) non-sticky.

In comparative experiments, some known absorbents were first saturated with number one heating oil for some hours. In practice this means that about one gram of absorbent absorbed about 8.5 grams of oil. The saturated absorbent then was placed upon the the sorbent of the present invention but not mixed therewith. After some time the known absorbent and the sorbent of the present invention were separated. It was found that the present sorbent had absorbed over 1.5 grams of oil from the known absorbent. The sorbent of the present invention thus is more oleophilic, or can be said to have a higher oil-absorbing capacity, than the known absorbent. It is possible that it is this property which renders the saturated sorbent of this invention non-sticky, because the sorbent itself has a firmer grip on oil than any other known absorbent or material.

In another experiment an oil saturated sorbent made according to the present invention was placed on sand and concrete and also on grass for several months. No oil damages at all could be observed, nor were they even visible on the support. Thus, with the sorbent of the present invention, it is not necessary to remove rehabilitated oil immediately, nor does it matter if small amounts of the sorbent (with sorbent oil) remain in nature. Oil degrading bacteria can also be added to the sorbent for effecting final rehabilitation in one operation, if desired.

The purely physical reason why the sorbent of the present invention is so superior to other materials in absorbing oil is not entirely clear, but it can be theorized that the fibers of the starting material, e.g., pulp reject, are fringy or can burst open by the rapid heating so that oil can be sucked into the fibers in a way that is different from that of other sorbent materials.

As a result of these superior properties as demonstrated by the noted experiments, the sorbent of the present invention also can remove oil from sand, concrete, stone, etc. Consequently, the sorbent can be used not only for the removal of oil from a water surface, but also for removing oil from beaches to which it adheres. Laboratory tests have shown that, when oil at the ebbing tide of water precipitates on a sand beach, and when the sorbent of the present invention is sprayed over the oil during ebb tide, the sorbent sucks up the oil. At returning tide water the sorbent is lifted up together with the oil as a more or less coherent cake. The beach is clean, and the sorbent simply can be collected by mechanical means.

Due to the fact that the sorbent of the present invention absorbs oil better than known absorbents and, after sorption, is not sticky (most of the known oil absorbents are sticky although they do not even absorb oil to 100%), it is possible to treat oil and other hydrocarbon liquids detrimental to the environment in ways which heretofore were not possible. For example, cleaning oil tankers can be accomplished by spraying or applying the sorbent on the oil-contaminated surfaces and letting it act thereon for some time, whereafter the sorbent can be flushed off together with the absorbed oil. The oil soaked sorbent can then be filtered from the water. The problems caused by waste oil in the flushing water are thus reduced.

It is also possible to manufacture from the sorbent of the present invention, filters for water mixed with oil which permit the water to pass therethrough but absorb the oil.

A further manner of using the sorbent is to discharge or spray the sorbent beneath oil on or in the water, so that sorbent rises to the oil and absorbs it from below. This reduces the risk of stickiness on the upper surface and on the lower surface, and at the same time the oil spots are held together more efficiently. This is important particularly in the case of heavy oil because the thick heavy oil can be collected much more simply than if it were sticky. The sorbent of the present invention has the property of adhering even to heavy oil immediately. Hence, while it may take several hours for the sorbent to absorb the heavy oil, it eliminates the stickiness on the surface immediately. Heavy oil thus treated, i.e., sprayed on the lower and upper surface with the sorbent of the present invention, can be collected immediately or whenever its collecting is deemed most suitable.

The total absorption capacity for the sorbent of the present invention is about seven liters of oil per kilogram sorbent.

The following examples are presented in aid of further illustrating the details of the present invention.

EXAMPLE 1

The pulp obtained by subjecting wood to a chemical pulping according to a known sulphite process was serially processed according to known methods to achieve washing, screening, cleaning and bleaching of the pulp. Reject material was obtained from the washing stage (Sample No. 1, so-called "Knotter" rejects); from the screening stage (Sample No. 2, screen rejects); and from the fourth-stage of a four-stage counter-current cleaning operation (Sample No. 3, "fourth stage" rejects). An additional reject sample (Sample No. 4) was obtained by subjecting knotter reject to a screening to remove coarse material (discarded) and retain (as Sample No. 4) the smaller size fibers thereof.

Each of the samples was pressed in a hand-press to remove a portion of the initial moisture. Thereafter, each sample was subjected to a stream of high temperature air (sample contained in a porous wire basket), approximately 700° F. for about 2 to 2½ minutes. The samples then were further dried in a rotary dryer using an air temperature of 700° F. for Sample 1, about 615° F. for Sample 2 and about 600° F. for Samples 3 and 4.

Conditions for the foregoing processing and measurements and observations (visual microscopic) made in connection therewith are summarized in Table I.

TABLE I

| | SAMPLE NO. | | | |
|---|---|---|---|---|
| | 1 | 2 | 3 | 4 |
| HAND COMPACTION | | | | |
| Wt. of Sample before compaction (oz.) | 26 | 38 | 22 | 80 |
| Wt. of Sample after compaction (oz.) | 18 | 16 | 9 | 36 |
| Liquid removed (oz.) | 8 | 22 | 13 | 44 |
| Moisture before compaction (wt. %) | 61% | 75% | 81% | 81% |
| Moisture after compaction (wt. %) | 43% | 52% | 64% | 58% |
| Volume before compaction (in$^3$) | 278.7 | 286.8 | 243.5 | 384.24 |
| Volume after compaction (in$^3$) | 232.7 | 235.4 | 220.5 | 267.8 |
| DRYING | | | | |
| Appearance after compaction | Parallel stringy, resinous fibers | imtermeshed fibers | fine, hair-like, interwoven fibers | Parallel, resinous fibers |
| Moisture after basket-drying (wt. %) | 37% | 41% | 40% | 49% |
| Appearance after basket-drying | Resinous, some opening of fibers | loosened, tangled fibers | loosened, hair-like | loose, parallel fibers |
| Moisture after rotary drying (wt. %) | 4% | 3% | 10% | 3 |
| Appearance after rotary drying | Disassociated fibers | Exploded, puffed, criss-crossed fibers | Very loose, hairy | Exploded, puffed, criss-crossed fibers |

Equal portions of the dried samples were spread on the surface of a small container containing water and a thin oil film floating on the water surface. Each sample displayed good oil absorption, the relative superiority among the sample being progressive from No. 4 (best) to No. 1 (least effective).

Example II

Sulphite reject was processed in an apparatus of the type shown in the drawing by placing 360 kg of fibrous sulphite reject (moisture content about 55%) in an oil burner exhaust zone having an initial temperature of about 400°–500° C. in the extrance where the reject is fed. The sulfite fibers subjected to these temperatures quickly brought the water content in the fibers to the boiling point and caused the fibers to burst or to change some way in their physical characteristics. As the fibers were brought along the exhaust zone, the water content continued to diminish and the temperature slowly went down. The fibers were in the exhaust zone for about 5 minutes. During the heating about 15,000 square meters of air was passed with the exhaust gases.

Portions of the thus prepared sorbent were subjected to testing for floating ability and oil absorption, as summarized in Table II.

TABLE II

Properties Measured For Sorbent Material of Example II (1) Density = 215 g/l.
(2) Maximum absorption of Fuel Oil EO4 from water surface at 20° C. (per 100 grams sorbent)   300–400 grams oil
(3) Floating Ability:
    (a) In Distilled Water (20° C.)

| After | Dry Material | Oil-Saturated Mat'l. |
|---|---|---|
| 8 hours | Yes | Yes |
| 1 day | Yes | Yes |
| 2 days | Yes | — |
| 5 days | No | — |

(NB: Yes = most of material floating; No = most of material sunk)
(b) In 3% salt water (20° C.)

| After | Dry Material | Oil-Saturated Mat'l |
|---|---|---|
| 8 hours | Yes | Yes |
| 1 day | Yes | Yes |
| 2 days | Yes | Yes |
| 5 days | — | Yes |

(c) In 3% salt water (2.5° C.)

| After | Dry Material | Oil-Saturated Mat'l. |
|---|---|---|
| 8 hours | Yes | Yes |
| 1 day | Yes | Yes |
| 3 days | Yes | Yes |

(d) Absorption Of Fuel Oil EO4 from glass surface:
100 gms. absorbent added to 100 gms. oil spread on glass plate; stirred with spatula for one minute. All oil absorbed, no sticky residue.

The hydrophobic sorbent of the present invention may, if desired, comprise or be prepared from more than one starting material. For example, a mixture of reject pulps from different paper making processes (sulphite, sulphate, Kraft) could be subjected to the expansion-causing, rapid heating. Alternatively, separately expanded (via rapid heating) starting materials can be mixed after expansion to form the sorbent material. Still further, the sorbent may comprise one or more expanded materials prepared according to this invention, together with other types of sorbent materials and/or other materials possessing some functionality desirably imparted to the overall sorbent.

The sorbent material of the present invention may, if desired, be employed in the removal of oil or other hydrocarbon materials "as is" or in conjuction with suitable packaging material (for example, a mesh-like structure confining the sorbent)

While the present invention has been described with respect to certain particularly preferred features and embodiments, the invention is not intended to be limited thereto. Various modifications and improvements to the description provided are obviously ascertainable by those skilled in the art without departing from the scope or spirit of the invention, as set forth in the appended claims.

What is claimed is:

1. A method for removing oil or other liquid hydrocarbons from surfaces contaminated therewith, comprising contacting said oil or hydrocarbon with an amount of a sorbent material sufficient to substantially sorb the oil or hydrocarbon and to bind said oil or hydrocarbon within said sorbent to a degree which renders the oil- or hydrocarbon-laden sorbent essentially non-sticky, said sorbent material comprising the product obtained by subjecting a moisture-containing fibrous starting material, consisting essentially of a member selected from the group consisting of reject fibers obtained from the chemical pulping of wood according to a sulphite process, reject fibers obtained from the chemical pulping of wood according to a sulphate process, and mixtures thereof, to rapid heating at a temperature sufficient to expand the fibers through gasification of the moisture therein.

2. A method for removing oil or other liquid hydrocarbons from solid surfaces contaminated therewith, comprising contacting said oil or hydrocarbon with an amount of a sorbent material sufficient to sorb the oil or hydrocarbon and to bind said oil or hydrocarbon within said sorbent to a degree which renders the oil- or hydrocarbon-laden sorbent essentially non-sticky, said sorbent material comprising the product obtained by subjecting a moisture-containing fibrous starting material, consisting essentially of a member selected from the group consisting of reject fibers obtained from the chemical pulping of wood according to a sulphite process, reject fibers obtained from the chemical pulping of wood according to a sulphate process, and mixtures thereof, to rapid heating at a temperature sufficient to expand the fibers through gasification of the moisture therein.

3. A method for removing oil or other liquid hydrocarbon from aqueous surfaces contaminated therewith, comprising contacting said oil or hydrocarbon with an amount of a sorbent material sufficient to sorb the oil or hydrocarbon and to bind said oil or hydrocarbon within said sorbent to a degree which renders the oil- or hydrocarbon-laden sorbent essentially non-sticky, said sorbent material comprising the product obtained by subjecting a moisture-containing fibrous starting material, consisting essentially of a member selected from the group consisting of reject fibers obtained from the chemical pulping of wood according to a sulphite process, reject fibers obtained from the chemical pulping of wood according to a sulphate process, and mixtures thereof, to rapid heating at a temperature sufficient to expand the fibers through gasification of the moisture therein.

4. A method according to claim 3 wherein said fibrous starting material consists essentially of reject fibers obtained from the chemical pulping of wood according to a sulphate process.

5. A method according to claims 1, 2, 3 or 4 wherein said moisture-containing fibrous starting material contains at least about 10% moisture by weight.

6. A method according to claims 1, 2, 3 or 4 wherein said rapid heating is conducted at a temperature in a range of from about 200° F. to about 1200° F.

7. A method according to claims 1, 2, 3, or 4 wherein said rapid heating is effected by suspending said fibrous starting material in a stream of air heated to said sufficient temperature.

* * * * *